United States Patent [19]

Su

[11] 4,120,043
[45] Oct. 10, 1978

[54] METHOD AND APPARATUS FOR MULTI-FUNCTION, STORED LOGIC BOOLEAN FUNCTION GENERATION

[75] Inventor: Chauchang Su, West Bloomfield Township, Oakland County, Mich.

[73] Assignee: Burroughs Corporation, Detroit, Mich.

[21] Appl. No.: 682,118

[22] Filed: Apr. 30, 1976

[51] Int. Cl.$^2$ .................. G06F 1/02; G06F 13/00
[52] U.S. Cl. .................................. 364/900; 364/716
[58] Field of Search ................. 340/172.5, 166 R; 235/152; 307/207; 364/900 MS File, 200 MS File, 716

[56] References Cited

U.S. PATENT DOCUMENTS

| | | | |
|---|---|---|---|
| 3,291,974 | 12/1966 | Even | 235/152 X |
| 3,454,310 | 7/1969 | Wilhelm, Jr. | 235/152 X |
| 3,458,240 | 7/1969 | Hanson | 307/207 X |
| 3,484,700 | 12/1969 | Armstrong | 307/207 X |
| 3,510,787 | 5/1970 | Pound et al. | 307/207 X |
| 3,611,309 | 10/1971 | Zingg | 364/900 |
| 3,619,583 | 11/1971 | Arnold | 235/152 |
| 3,783,254 | 1/1974 | Eichelberger | 235/152 |
| 3,816,725 | 6/1974 | Greer | 235/152 |
| 3,902,050 | 8/1975 | Schmidt et al. | 235/152 |
| 3,934,231 | 1/1976 | Armstrong | 340/172.5 |
| 4,001,789 | 1/1977 | Sweet | 364/200 |

*Primary Examiner*—Melvin B. Chapnick
*Attorney, Agent, or Firm*—Larry Michael Jarvis; Kevin R. Peterson; Edward J. Feeney, Jr.

[57] ABSTRACT

A stored logic Boolean function generator having a control word storage coupled to a control block for selectively configuring the control block into logic circuits for simulating either a logical AND circuit or a logical OR circuit for operating on binary signals. At least two external addressable binary signal stores are coupled to the control block. The two external addressable stores alternately and oppositely serve as source and destination storage devices for binary signals which are operated upon by the control block. One of the addressable stores serves as a source of binary signals which are supplied to the control block and operated upon by the logical circuit simulated therein. The results of the logical manipulation are stored in the other of the externally addressable stores which thus serves as a destination storage device. The control block is reconfigured according to the next successive control word stored in the control word storage and the flow of binary data through the control block is reversed such that the former destination store serves as the source of binary signals to the control block and the former source store serves as the destination for the control block. The binary data is continually circulated through the control block until the sequence of logical operations stored in the control word storage has been completed and the predetermined logical function performed.

8 Claims, 10 Drawing Figures

METHOD AND APPARATUS FOR MULTI-FUNCTION, STORED LOGIC BOOLEAN FUNCTION GENERATION

BACKGROUND OF THE INVENTION

1. Field of the Invention

The invention relates to a method and apparatus for stored logic Boolean function generation and more particularly to a function generator for use to implement a character recognition system.

2. Prior Art

Various systems have been proposed for recognition of characters such as printed or otherwise formed letters on information-bearing material. Such characters are alphabetical, numerical or various special symbols.

Generally, documents are fed past a character scanning station by a document transport system. The scanned information is then supplied to a suitable matrix in which the information is shifted in synchronism with the motion of the character past the scanning device. A suitable logic circuitry mask is connected to the storage matrix so that when the character information occupies a predetermined arrangement of storage positions, an output circuit will be energized to provide an indication of the identity of the character scanned.

Such character recognition systems involve a considerable amount of hard-wired logic as a part of the logic circuitry mask. Where it is desired to scan a new alphabetical arrangement, circuitry changes of the hard-wired logic have to be performed including installation of new apparatus.

Accordingly, one object of this invention is to provide a character recognition system which replaces hard-wired logic with the flexibility of a stored logic approach wherein the circuitry logic can be quickly replaced by a simple storing in memory of bit words for implementation of a new alphabetical recognition circuitry. Although a stored logic approach consumes a larger amount of operational time as compared to the hard-wired approach, the system would be highly welcome in certain character recognition fields in which alphabetical changes would be frequent and time consumption of a small balancing factor, as for example, in foreign language translation systems and written code decoding networks.

SUMMARY OF THE INVENTION

It is therefore an object of this invention to provide a method of logic function generation utilizing a stored instructional approach.

It is a further object of the present invention to provide a stored logic, Boolean function generator adapted to operate on single-bit inputs to produce a functional output thereof.

It is a further object of this invention to provide a character recognition system utilizing a stored logic circuitry capable of quickly changing the character alphabet from which the symbols are to be identified.

These and other objects of the invention are accomplished in a logic circuitry controlled by stored instructions for simulating sequential single logical operations on a set of stored signals and storing the outputs of the operations for subsequent operations thereon in similar instructed manner by the logic circuitry in accordance with other prearranged stored instructions. The logic circuitry continues operating on prior operational outputs until the Boolean functional values of the stored signals are produced.

BRIEF DESCRIPTION OF THE DRAWINGS

Other objects, features and advantages of the invention will be readily apparent from the following description of the preferred embodiment taken in conjunction with the appended claims and accompanying drawings in which:

DETAILED DESCRIPTION OF THE PREFERRED EMBODIMENT

Figure 1:
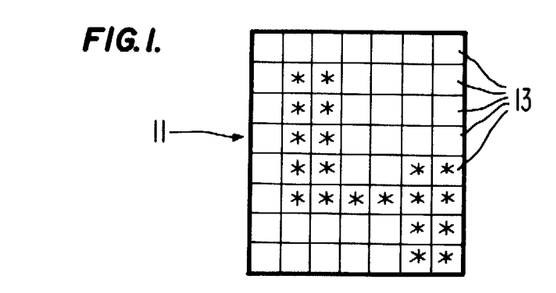
FIG. 1 is a stored matrix representation of the character "4"

In a character recognition system, a document or other character bearing medium conveys a sequence of characters past a character detector system for developing a set of signals representative of the detected character. FIG. 1 illustrates an example of such a set of signals in a matrix array 11 representative of the character "4". The signals may be obtained, for example, from a CRT flying-spot scanner outputted to a clocked shift register matrix. The signal data in the shift register has a direct correspondence to the character information scanned from the document. The presence of a "high" bit value at any location of the shift register is representative of the darkened portions of the scanned character.

After the unknown character information has entered the shift register, a mask character recognition circuit analyzes the combinations of bits which define specific measurements representative of the scanned character. Output lines from the cells of the shift register are connected to a mask circuit for producing an output to identify the character scanned.

The instant invention finds utility for the recognition of an alphabet having ($d$) alphanumeric or other characters $C_0, C_1 \ldots C_{d-1}$. Each character is scanned and digitized into a rectangular $m \times n$ matrix 11 with binary (dark or light) elements 13 as depicted in FIG. 1. Each light element represents a low Boolean value, e.g. "0", and each dark element represents a high Boolean value, e.g. "1".

Logical manipulation of the binary signals can be accomplished by interconnections of circuitry consisting of AND, OR and NOT gates. The logical manipulation is referred to as the Boolean function of the high and low input variables of the matrix 11. For each character $C_i$ in the alphabet A, a Boolean function $B_i$ is formed by relating the matrix's elements of the character $C_i$ with AND, OR and NOT operations to produce an output, e.g. high, whenever the elements of character $C_i$ are formed in the matrix. Thus, the input variables are expressed as functions $B_0, B_1 \ldots B_{d-1}$ for a respective alphabetical character $C_0, C_1 \ldots C_{d-1}$. If a matrix's elements are such that exactly one $B_i$ is true, the corresponding $C_i$ is taken as the identity of the character scanned.

Figure 2:
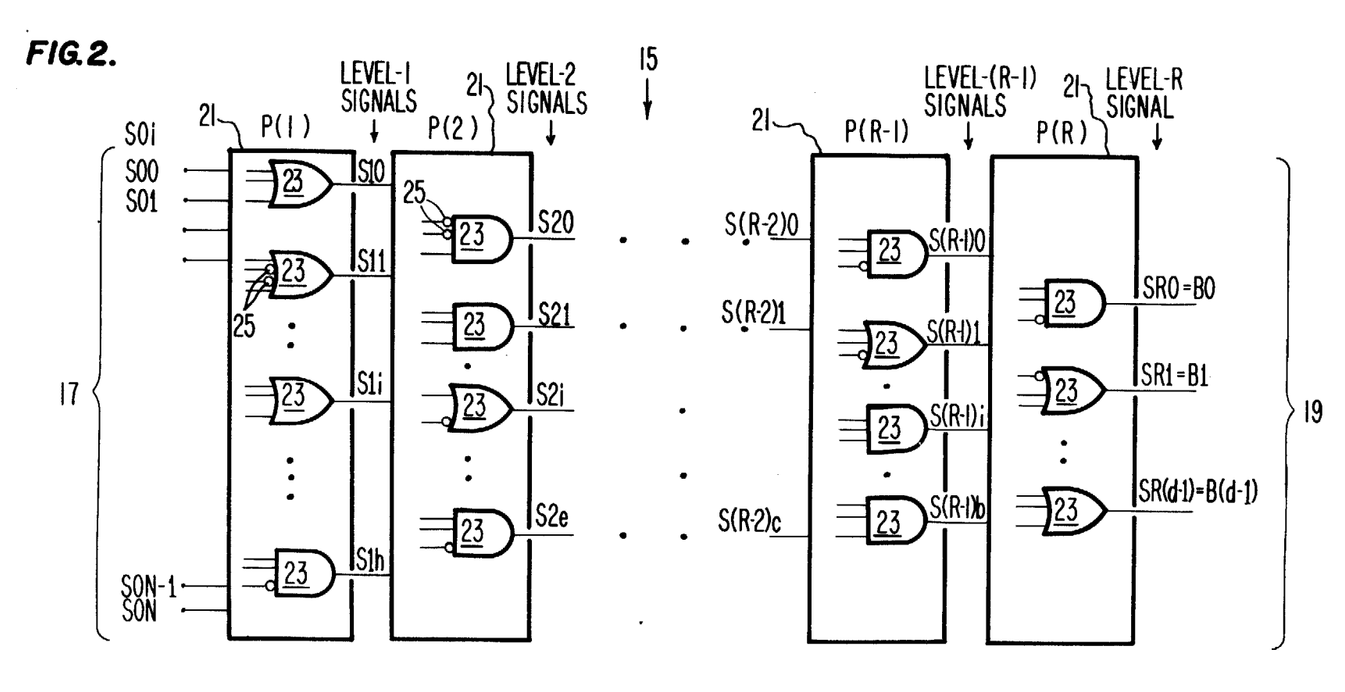
FIG. 2 is a block diagram of a Boolean format in terms of switching gates.

The character recognition circuitry for performing the Boolean function $B_i$ may be expressed in different ways, of which the circuitry 15 of FIG. 2 is an illustrative one.

The character recognition circuit 15 realizes the set B of Boolean functions as an (N+1) input combinatorial circuit having outputs 19 of $B_i$, $i=0, 1 \ldots d-1$. The inputs 17 represent the signals of the matrix 11 of FIG. 1. The character recognition circuit 15 comprises consecutive stages or levels of logic circuit blocks 21, each denoted by P(t), where $1 \leq t \leq R$ and where R is the rank of the Boolean function. Each circuit block 21 comprises a plurality of logic gates 23 each denoted by P(t, i), where t is indicative of the logic block containing the gate and i is indicative of the gate within that logic block. The NOT (inverting) operation may be positioned at any input or output of the logic gates 23 as indicated by small circles 25. The inputs to the first logic circuit block P(1) are the matrix's elements 13 of the matrix 11 formed by scanning the character $C_i$.

As seen in FIG. 2, each logical block 21 produces an output of signals which may be identified as a particular level of signals, with the matrix input signals identified as level zero signals and each level of signals thereafter increasing by 1 to level R signals which are the resultants of the Boolean functions $B_i$ at 19. These particular levels of signals may be expressed as S(k, i), where $k=1, 2 \ldots R$, indicating the level of the signal and $i=0, 1, 2 \ldots$, indicating a particular signal in that level. Thus, the zero level signals of the matrix elements may be represented as S(0, i), $i=0, 1 \ldots N$ where $N = m \times n - 1$. Any other level of signal k, may be expressed as S(k,i), $k=1, 2 \ldots R$, as defined accordingly:

(1) if a signal S is a logical product or a logical sum of level $(k-1)$ signals and is a term or a factor in at least one $B_i$ then S is a level k level; or (2) if a level $(k-1)$ signal S is a factor in a logical product, or term in a logical sum involving level j signals, $j \geq k$, in at least one $B_i$, then S is also a level k signal.

Thus, a signal S(t,i) is generated by the logic gate P(t,i) with inputs $S(t-1, u) S(t-1,v) \ldots$ and $S(t-1, w)$, where $1 \leq t \leq R$.

Figure 3:
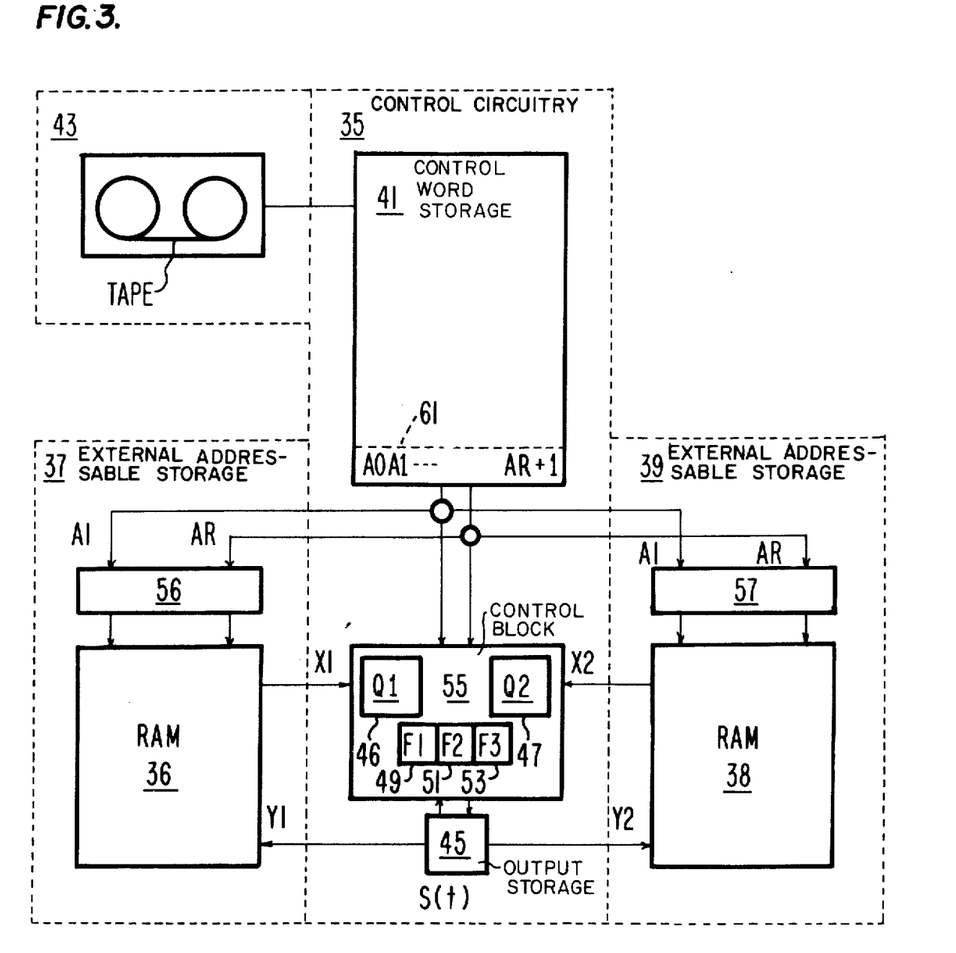
FIG. 3 is a block diagram of a stored logic circuitry according to the present invention.

To implement a given Boolean function or functions, the present invention utilizes a stored logic system of FIG. 3 which is described hereinafter according to a Boolean function format as may be represented by that of FIG. 2.

A control circuitry 35 of the stored logic system is operatively associated with two external addressable storages 37, 39, each including a random access memory (RAM) 36, 38, respectively. Initially the zero level signals representative of the informational data of FIG. 1 are stored in the RAM 36. The control circuitry 35 then operates upon the initial data of RAM 36 for producing outputs which are stored in RAM 38, the outputs being representative of level 1 signals. The control circuitry then operates upon the level 1 signals of RAM 38 producing an output of level 2 signals which are stored in storage 36. In this fashion, the control circuitry cyclically repeats operation on the output levels of the previous operation until eventually the level R signals are computed. Therefore, a level operation is a transformation of a level of signals to a higher level of signals.

During a level operation on a level of signals stored in one of the RAMs, the control circuitry 35 sequentially simulates individual gate functions P(t,i) for operating on certain of the level signals to produce an output of one of the next level signals, storing the same in the opposite RAM. During each gate simulation different of the data in the input RAM is operated upon. Single gate simulation continues until all logic function gates of that particular logic block have been simulated to produce the next level of signals.

To simulate each individual gate function the logic circuitry 35 includes a 1-bit output storage 45 whose value is controllably set responsive to the type of gate simulated and the value of the inputs retrieved from the intput RAM. For example, where control circuitry 35 is to simulate an AND gate, the output storage 45 is initially set to a "1" value. The appropriate input signals to this AND gate function are examined sequentially from the external memory location in the corresponding input RAM. Where the input signal equals 1, the value of the output storage remains unchanged and the following input signal is then examined; however, if an input signal is 0 then the output storage 45 is set to 0 and the output value of the AND gate equals 0 regardless of the other input signals examined. Where the logic circuitry 35 is to simulate an OR gate, the output storage 45 is initially set to 0 and the input signals are sequentially examined from the external memory location. The output storage 45 is maintained at 0 until an input of 1 is encountered, upon which the gate is set to 1, registers final output of the gate simulated.

Where a signal is desired to be passed from one level to the next, an OR gate simulation with one input may be used for such.

The control circuitry 35 includes a control word storage 41 which contains control words examinable for directing simulation of specific function gates to perform operations upon certain externally stored signals for implementation of a defined set of Boolean functions, preferably placed in the form of that of FIG. 2. Control word examination affects a control block 55 of the logic circuitry for controlling individual gate simulation.

The control block 55 comprises five registers for controlling the operation and mode of the control circuitry 35. A Q1 storage register 46 indicates the current functional mode of the control circuitry 35 according to the value of a single bit storable in Q1; if Q1 equals 0 the circuitry performs the function AND; if Q1 equals 1 the logic circuitry performs the function OR. A Q2 storage register 47 indicates the roles of storages 37 and 39 according to the value of a single bit storable in Q2; storage 37 is the input storage if Q2 equals 1; storage 39 is the input storage if Q2 equals 0. A F1 storage register 49, F2 storage register 51 and F3 storage register 53 cooperate as further control storage registers to properly operate the system and may be set for visual display to promote operator coordination with the system, as desired. The control block 55 comprises other circuits which are responsible for timing coordination of the operations of the entire system.

The storage 41 is loaded with control words W where W equals A(0), A(1), A(2) . . . A(R), A(R+1), and can be either an instruction or an address word. The control words W may also be data words for initially loading the system with inputs, where the environment lends itself to such, as will suggest itself to those skilled in the art.

If W is an instruction word, the bits A(0), A(1) and A(2) combine to indicate one of eight instructions. The remaining bits A(3), A(4) . . . A(R) are each set to 1 to indicate that W is an instruction word. The end bit A(R+1) is used as a parity check bit. The eight instructions and their codes are as follows:

| Instruction | Code: | A0 | A1 | A2 | A3 | ... | Ar | A(r+1) |
|---|---|---|---|---|---|---|---|---|
| (1) Initialization | | 0 | 0 | 0 | 1 | .... | 1 | t |
| (2) Begin AND | | 1 | 1 | 1 | 1 | ... | 1 | t |
| (3) Begin OR | | 0 | 1 | 1 | 1 | ... | 1 | t |
| (4) Next AND | | 1 | 0 | 1 | 1 | ... | 1 | t |
| (5) Next OR | | 0 | 0 | 1 | 1 | ... | 1 | t |
| (6) Scan | | 1 | 1 | 0 | 1 | ... | 1 | t |
| (7) End | | 1 | 0 | 0 | 1 | ... | 1 | t |
| (8) Reject | | 0 | 1 | 0 | 1 | ... | 1 | t | where $t = A(0) \oplus A(1) \oplus \ldots \oplus A(r) \oplus 1$.

Control block 55 sequentially inspects the words of storage 41. Storage 41 can either be a random access memory or a sequential access memory such as a shift register, disk or drum memory. The words as stored in the storage 41 implement a particular Boolean function which may be used for recognizing certain characters of a specific alphabet. The words of storage 41 can be loaded by a storage 43 which contains permanent copies of various stored sets of words for simulating particular Boolean functions, which for example may be representative of different character recognition alphabets.

Initially, level 0 signals S(0,0), S(0,1) ... S(0,N) are stored in storage 37 at addresses 0, 1 ... N, respectively. With the data initially stored in storage 37, the control circuitry 35 may operate on the data either beginning automatically or by operator initialization.

Figure 4:
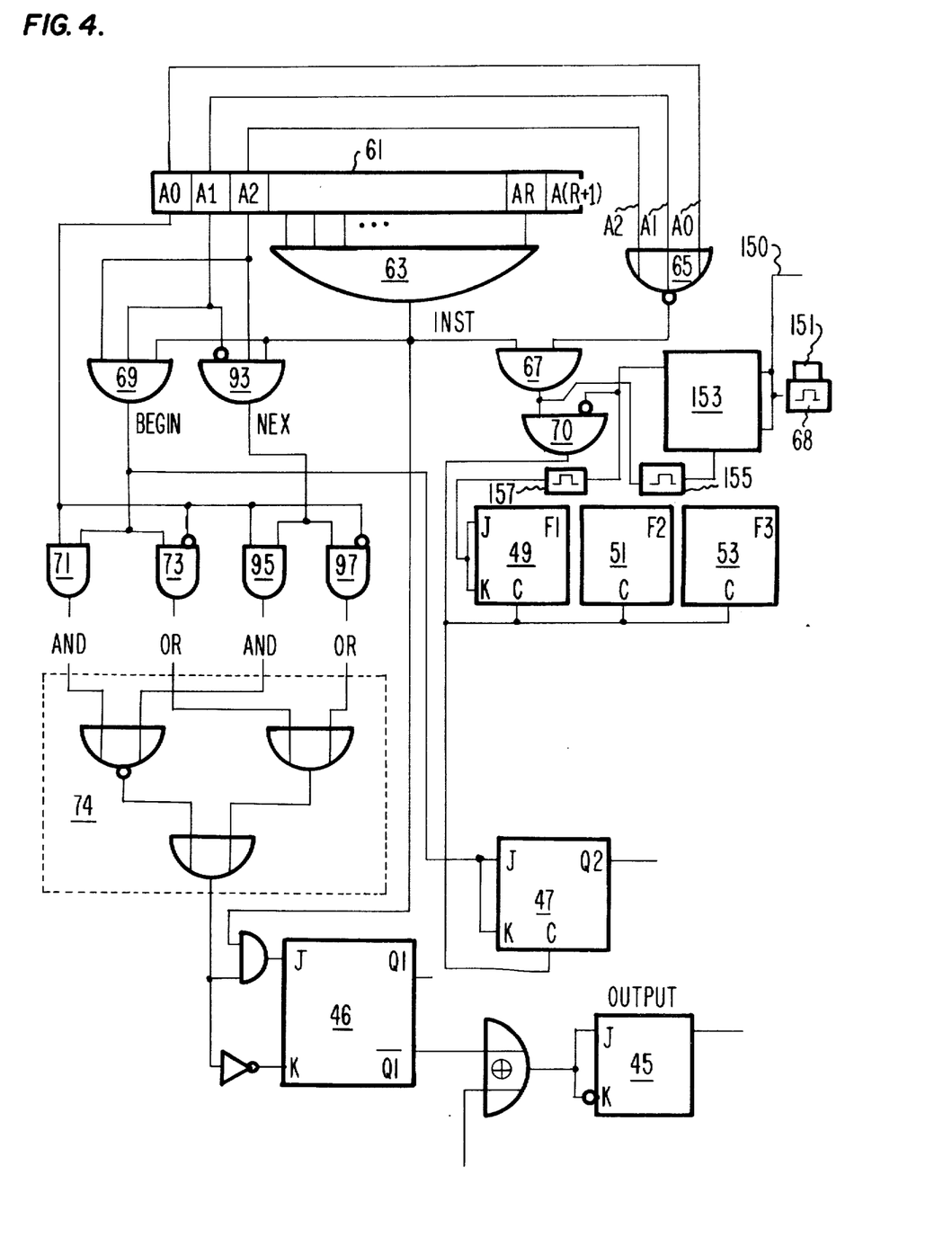
FIGS. 4–10 are partial schematic diagrams of the control circuitry 35 of FIG. 3.

As an operator switches the system to start, a first word is a read from storage 41 into a register 61. Referring to FIG. 4, AND gate 63 examines bits A3, A4 ... AR to determine whether the word read from storage 41 is an instruction word. AND gate 63 produces a INST output, where INST = $A(3)^*A(4)^* \ldots ^*A(r)$, for producing an output of 1 if the retrieved word is an instruction word. NOR gate 65 examines the bits A(0), A(1), and A(2) of the instruction word for producing a 1 output to indicate that the instruction word is an INITIALIZATION instruction. Thus, a 1 output from gate 63 indicates that W is an instruction word and a 1 output from NOR gate 65 indicates that W is the INITIALIZATION instruction.

The storage 41 can be sequentially searched until the INITIALIZATION instruction is encountered. The INITIALIZATION instruction tells the system that the subsequent order of control words from that word on will properly simulate the Boolean function desired.

The output of NOR gate 65 and AND gate 63 are fed to an AND gate 67 for setting the storage registers Q2 to 0, F1 to 0, F2 to 0, and F3 to 0, to initialize the system for beginning Boolean function generation. The system may stay in this initial stage of $F = (0, 0, 0)$ until it is instructed by an external command via switch 68 to begin sequentially reading the next words of the storage 41. The switch 68 is operable by a push-button 151 to toggle a flip-flop (FF) 153 from its "0" state (initially cleared thereto by the INITIALIZATON instruction via pulse standardizer 155) to a "1" state. The operator's starting of the system at switch 68 disables the initialization signal from gate 67 via AND gate 70, and causes F1 to go to 1, via pulse standardizer 157.

In addition, the system may be started automatically without operator intervention by a pulse signal along line 150 for toggling FF153 in a manner similar to that of the switch 68. For example, during the system state of $F = (0, 0, 0)$ a character scanner may load signal data into RAM 36, upon the completion of which the scanner or other device transmits pulse signal to node 150 for placing the system in the state $F = (1, 0, 0)$. The scanner may operate to scan succeeding characters as the system re-enters its $F = (0, 0, 0)$ state.

$F = (1, 0, 0)$ is the normal running state of the system; in this state the words of storage 41 will be executed in the order that they appear, i.e., the system is instructed to sequentially retrieve control words from storage 41 to register 61.

The control words may be retrieved from storage 41 in a number of ways, e.g. storage values in F of $F \neq (0, 0, 0)$ may enable a clocked signal to increment an address word register for sequentially addressing the storage 41 to output a stored word to register 61. Or such storage values of $F \neq (0, 0, 0)$ may enable a clocked signal to incrementally shift the storage words of storage 41 through address register 61. The timing of the clocked signal used may be established according to circuitry parameters, and if desired may be asynchronous.

The next word read into register 61 after the INITIALIZATION instruction word is a BEGIN instruction word. An encounter of a BEGIN instruction tells the system that a logic block of gate functions is about to be simulated. Thus, using a Boolean format similar to FIG.2, the number of logic blocks 21 equals the number of BEGIN instructions stored in storage 41. The BEGIN instruction switches the value of $Q_2$ of the system to indicate that the RAM storages have switched input and output functions. The BEGIN instruction also carries with it an instruction as to the first gate to be simulated in the logic block; either a BEGIN AND instruction or a BEGIN OR instruction may appear.

Referring to FIG. 4, a high output from gate 63 indicates the word read is an instruction word and a high output from an AND gate 69 indicates that the instruction word is a BEGIN instruction. AND gate 69 may be said to produce a BEGIN output, where BEGIN = $A(1)^*A(2)^*INST$. A high output of gate 69 toggles $Q_2$ storage register 47, shown as a JK flip-flop 47 in FIG. 4, causing $Q_2$ to go to a $\overline{Q}_2$ output. This establishes that a succeeding logic block operation on the outputs produced from the prior operation (or initial data) is about to begin.

A pair of AND gates 71 and 73 produce a high output if their respective BEGIN function, AND or OR, is to be simulated. A high output from gate 71 causes $Q_1$ storage register 46, shown as a JK flip-flop 46 in FIG. 4, to go to 0 (indicating AND operation) and a high output from AND gate 73 causes $Q_1$ to go to 1 (indicating OR operation). The gates 71 and 73 logically cooperate with $Q_1$ storage register 46 to appropriately set $Q_1$ by way of a circuitry 74. Because the outputs of gates 71, 73 are always complements of each other, only one of the gates need be utilized to set $Q_1$. Accordingly, circuitry 74 can take on different logical schematics as may suggest themselves to those skilled in the art.

The output storage 45, shown as a JK flip-flop 45 in FIG. 4, is correspondingly set to the value of $\overline{Q}_1$ (in coordination with other circuitry) as the initial output value of the AND or OR function to be performed. Thus, a setting of $Q_1 = 0$ by a high output from AND gate 71 indicates that the AND operation is to be performed, and the storage 45 is set to 1 as a temporary value of the output of the AND function. In the same manner, a high output from gate 73 sets $Q_1 = 1$ indicating that the OR operation is to be performed and the storage output of 0 is set as the temporary output value of the OR operation.

With F still in its run state, (1, 0, 0), the next words are sequentially shifted to register 61. The words following a BEGIN instruction are address words, whose address portion A(1), A(2) ... A(R) specifies the addresses of input signals to be related by the current operation. The bit A(0) of the address words indicates whether the signal stored at that address is to be inverted upon access from the input RAM. If A(0) equals 0 the output from the RAM memory is inverted. The remaining bits A(1), A(2) ... A(R) indicate an address of the RAM, however it is not permitted that A(3), A(4) ... A(R) = 1, 1 ... 1, for then the word would signify an instruction word.

Figure 5:
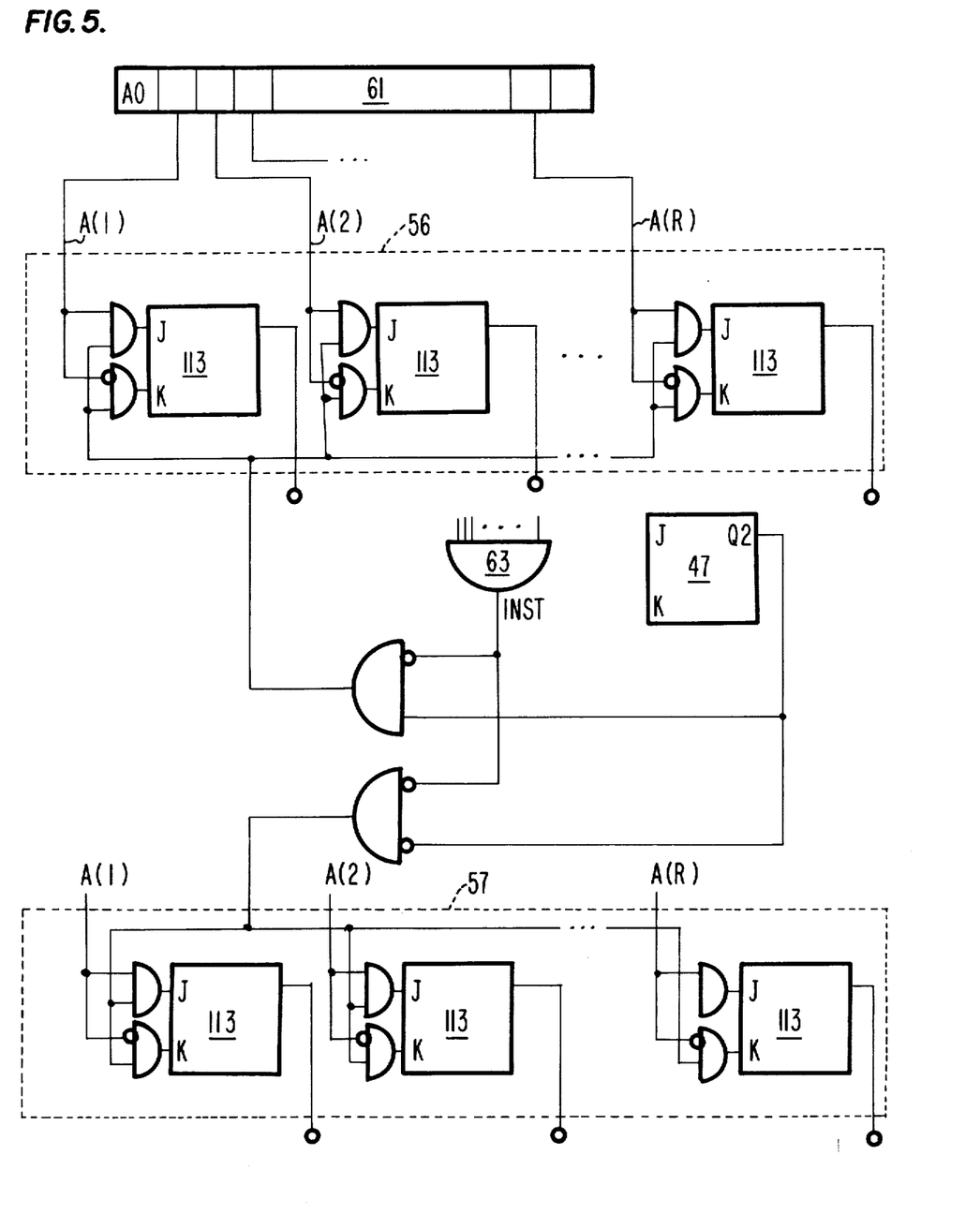

Referring to FIG. 5, the address registers 56 and 57 may include a plurality of JK flip-flops 113. A zero output from AND gate 63 (indicating that an address word is in register 61) operates to shift the contents of register 61 to either address register 56 or to address register 57 depending upon the value of $Q_2$. If $Q_2 = 1$ RAM 36 is addressed by the bit word placed in address register 56, or if $Q_2 = 0$ RAM 38 is the memory addressed from address register 57.

Where, for example, RAM 36 is the input RAM of the system (FIG. 3), address register 56 receives addresses from storage 41 to retrieve appropriate input signals $X_1$ from the RAM; the other address register 57 will also contain an address for determining the location in output RAM 38 for storing the output $Y_2$ of the performed operation. The output address stored in address register 57 not only permits storing of signal $Y_2$ at that address, but will also output a signal $X_2$ to the control block 55. Thus, the control block must discriminate between two received signals $X_1$ and $X_2$ as to which is the appropriate input signal.

Figure 6:
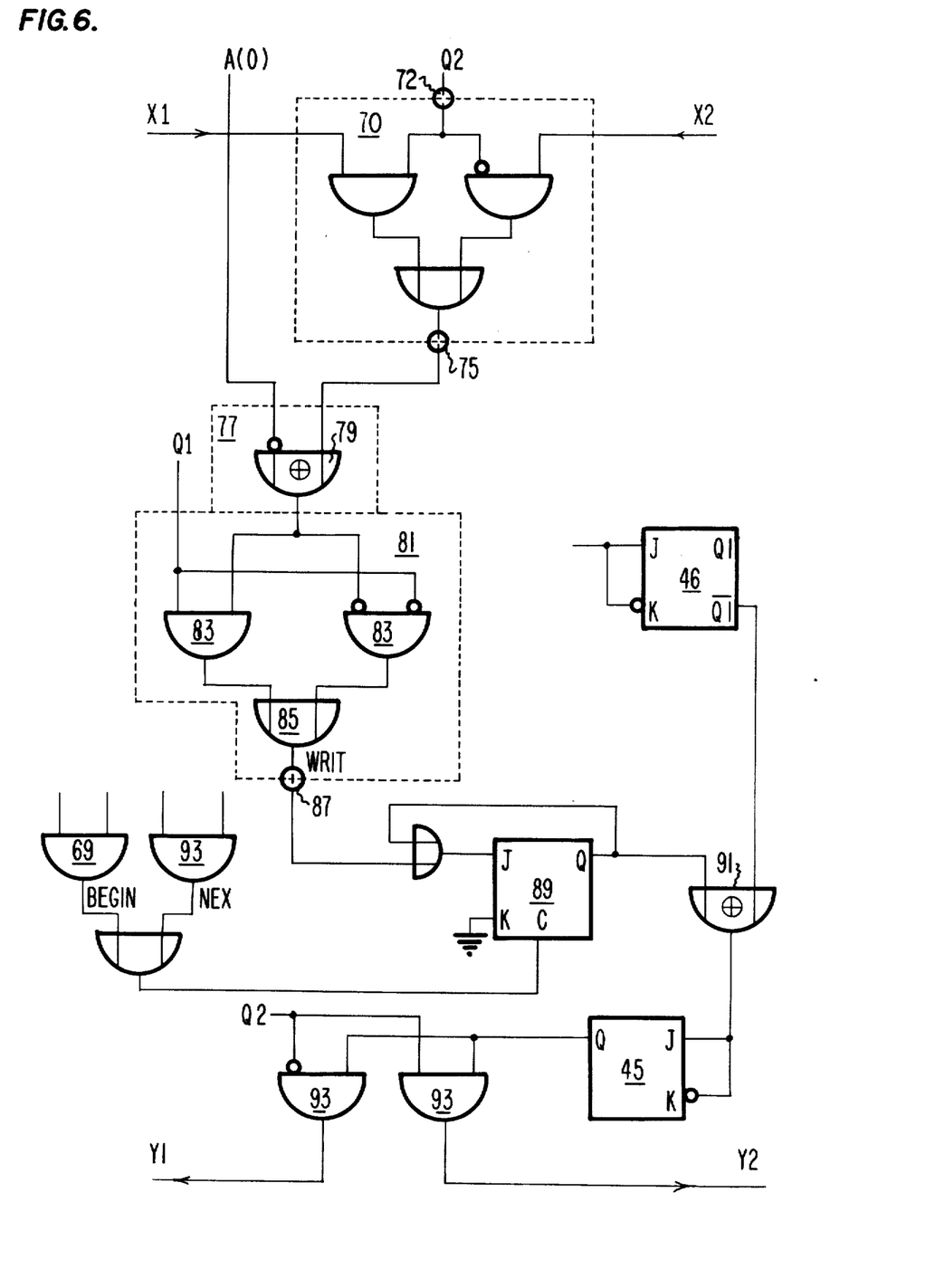

Referring to FIG. 6, the control block 55 includes a circuitry 70 for accepting only one of the inputs $X_1$ or $X_2$ according to the value $Q_2$. $Q_2$ is fed to the circuitry 70 at node 72 produce either $X_1$ or $X_2$ at node 75 dependent on the value of $Q_2$.

The output of node 75 (either $X_1$ or $X_2$) is fed to an inverter network 77 for inverting $X_1$ or $X_2$ according to the value of A(0) of the address word in register 61. The inverter circuitry 77 includes a ring sum gate 79 which inverts the output $X_1$ or $X_2$ whenever A(0) = 0.

Control block 55 now operates upon the output of inverter 77 in accordance with the function OR, or AND to be performed by making an appropriate change to the output register 45.

The output of gate 79, is fed to a circuitry 81 comprising a pair of AND gates 83 and an OR gate 85 for operation on the output of gate 79, in accordance with the value of $Q_1$. The operation performed by circuitry 81 produces an output "WRIT" at node 87. An output of WRIT = 1 signifies that the input is 0 for an AND operation or that the input is 1 for an OR operation. Thus, whenever WRIT = 1 during gate P(t,i) simulation the final output of the gate P(t,i) will be the output register 45 inverted, otherwise, where WRIT always equals 0 during gate simulation, the final output of the gate equals the initial value stored in the output register 45.

This is illustrated by JK flip-flop (FF) 89 which latches itself to be maintained at a 1 value whenever WRIT = 1. The clear input C of FF89 clears its output to 0 whenever the simulation of a gate function begins, by retrieval of a BEGIN or NEXT instruction. The FF89 output remains 0 until WRIT = 1 occurs, latching the FF in its 1 state until cleared again to 0.

The output of FF89 operates with the $Q_1$ storage register 46 via ring sum gate 91 for storing the inverted value of $\overline{Q}_1$ (i.e. storing $Q_1$) whenever WRIT = 1, in the output storage 45. So long as FF89 remains 0, $\overline{Q}_1$ is stored in output storage 45. Output storage 45 is connected with a pair of AND gates 93 for directing the output of the gate P(t, i) simulated to the appropriate RAM 36 or 38 depending upon the directional value of $Q_2$.

A new gate in the same logic block is simulated upon retrieval from storage 41 of a NEXT instruction. AND gate 93 (FIG. 4) produces a NEX output, where NEX = $\overline{A(1)}$*A(2)*INST. A NEX output of 1 indicates receipt of a NEXT instruction and the beginning of a new gate simulation on the same inputs as the last operation. But before the next operation can be simulated, the prior operation's output must be stored in the output RAM. Thus, the NEX signal is utilized to store the output ($Y_1$ or $Y_2$) of the prior simulated gate into the appropriate output storage RAM.

Outputs $Y_1$ and $Y_2$ are directly connected to the storage RAMs 36 and 38 respectively, for storage at the location corresponding to an address stored in its respective address register 56 or 57. A BEGIN instruction initially stores a zero address, 0, 0 ... 0, in the address register of the output RAM. As each NEXT instruction is received, this address in the output address register is incremented by one.

Because $Y_1$ and $Y_2$ are directly connected to the output RAMs, as the value of $Y_1$ or $Y_2$ changes from a 0 to a 1, the output stored in its output RAM location also changes so long as the value in the address register is maintained. Thus, upon receipt of a NEX instruction, a NEX output at gate 93 operates to increment the address of the register of the output RAM for retaining the present output $Y_1$ or $Y_2$ stored at its former address location.

Figure 7:
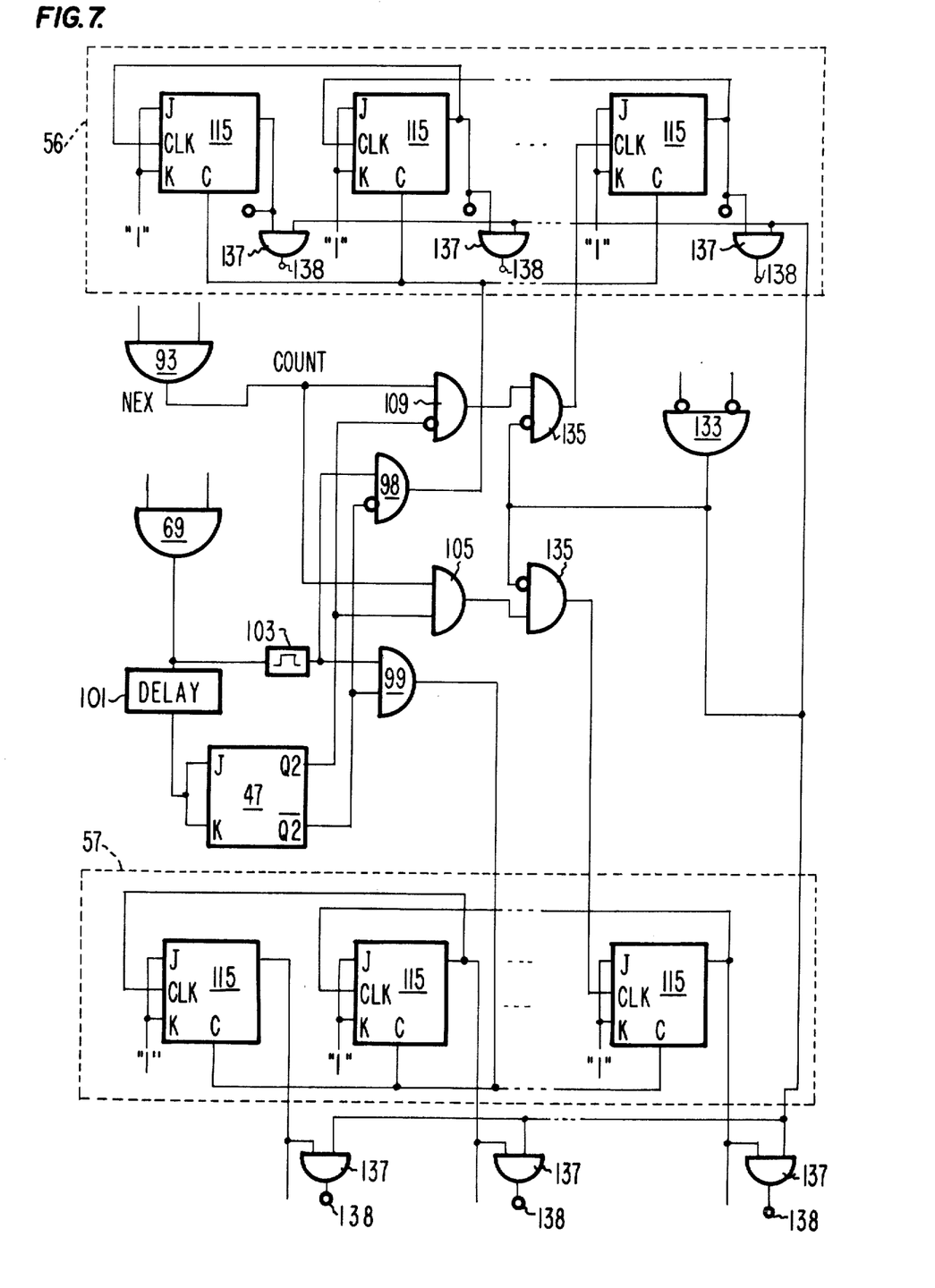

To provide for register incrementation, the address registers 56 and 57 may include another set of JK flip-flops 115 as shown in FIG. 7. Each JK flip-flop 115 of the address registers have clear inputs operable to set each FF to zero by a high output of the BEGIN signal FROM the gate 69. A pair of AND gates 98, 99 function to direct the BEGIN signal to an address register, 56 or 57, determined according to the value of $\overline{Q}_2$ of storage register 47 before storage register 47 is toggled by the BEGIN signal. A pulse standardizer 103 may be used to clear the register by a short pulse initiated by the leading edge of the BEGIN signal, and delay element 101 may be utilized to insure that the desired address register is cleared before storage register 47 is toggled.

The JK flip-flops 115 of the address registers are controllable as up counters for counting according to an input of the NEX signal from gate 93. AND gates 109 and 105 operate to direct the NEX signal count to the appropriate address register according to the value of $Q_2$. The FF's 115 are arranged in a ripple-through-counter arrangement as shown in FIG. 7. Other counter arrangements may also be utilized for incrementing the output address register with each NEXT instruction retrieved from the control word storage 41.

Figure 8:
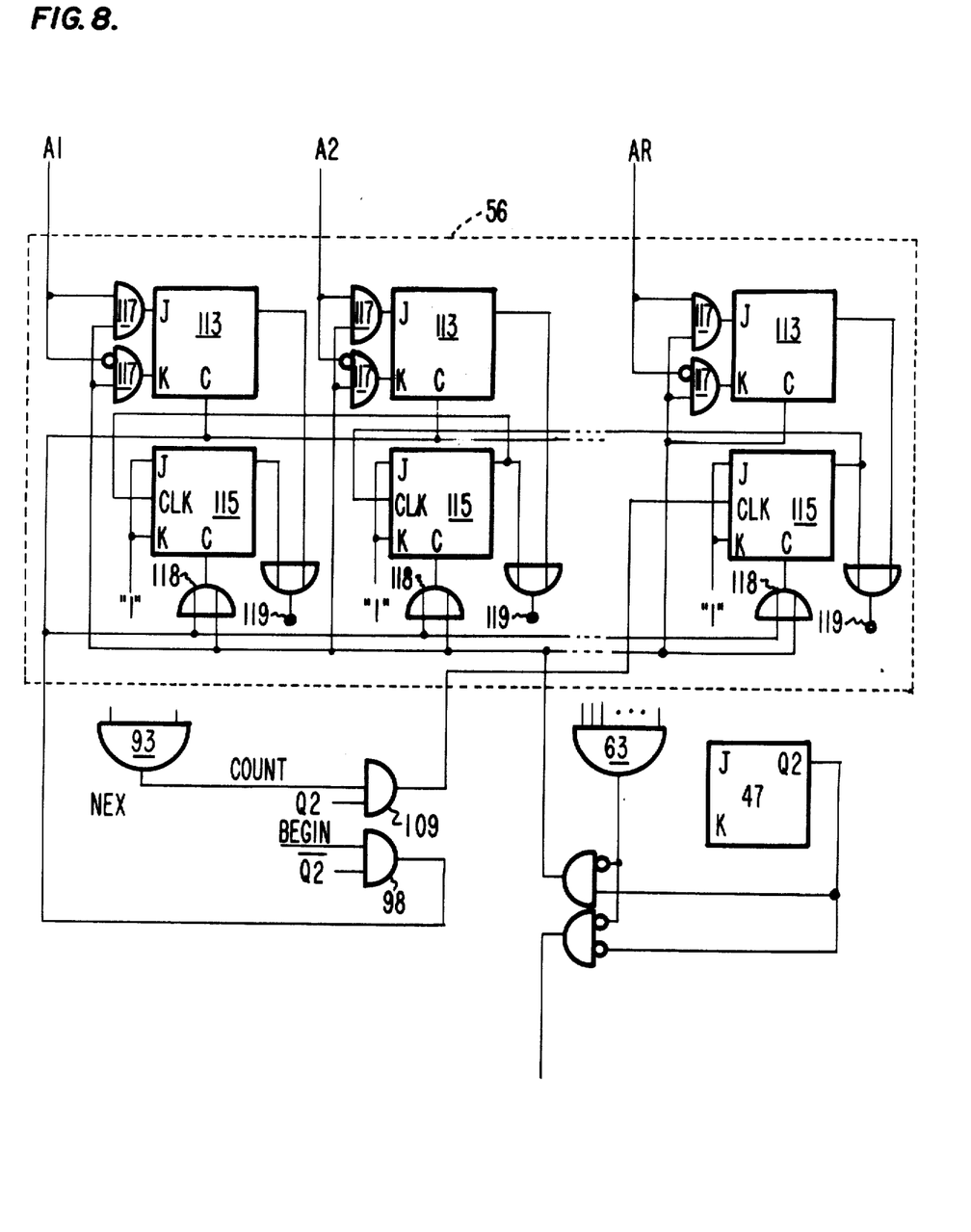

The FFs 113 of FIG. 5 and the FFs 115 of FIG. 7 may be combined as illustrated in FIG. 8 to form the address registers 56, 57 which are capable of either receiving direct inputs of addresses from the control word storage 41 or functioning as an up counter for address incrementation, according to the value of $Q_2$.

Thus, referring to FIG. 8 illustrating the single address register 56, when $Q_2 = 1$ the address register 56 is enabled via AND gates 117 to load the address words from register 61 into the FF's 113. The FF's 115 are kept cleared via OR gates 118 such that the output 119 of address register 56 is the stored value of FF's 113. When $Q_2 = 0$, the address register 56 is enabled via AND gates 109 and 98 to function as an up counter. The BEGIN signal from gate 98 initially clears the FF's 115 to store an 0 address; the FF's 113 are also cleared by the BEGIN signal. The address register 56 is enabled as an up counter driven by the NEX signal from gate 109 producing an output of the count at output 119. Address register 57 functions similarly as address register 56, but just oppositely in modes according to the value of $Q_2$. As appreciated by those skilled in the art, other logic circuitry may be utilized such that the value of $Q_2$ determines which of the address registers is to function as an up counter incremented by the NEX signal while the other address register is to receive direct address words from register 61.

Referring again to FIG. 4, whether the NEXT instruction provides an AND or OR gate simulation is determined by a pair of AND gates 95, 97 operating in the same fashion as do the BEGIN instruction function gates 71 and 73. As did the AND and OR signals of gate 71, 73, the AND and OR signals of gate 95, 97 cause $Q_1$ to conform to the type of operation, and the appropriate output value is stored in the output storage 45.

Because the NEX signal causes the output address register to increment by 1, the new output value in the output storage 45 will be at the location in the RAM next to the previous output. As the control word 41 continues to be accessed, address words specify the inputs to be operated upon. The process repeats for each gate P(t,i) simulation according to other NEXT instructions sequentially accessed from control word storage 41.

After each t,i) simulation on level $(t-1)$ signals has been completed, all the $t$ signals have been calculated and stored in consecutive locations of the output RAM starting at address 0. The level $(t-1)$ signals then have no further use and may be erased.

The calculation of the next level of signals $(t+1)$ is initiated by another BEGIN instruction which reverses the state of $Q_2$ by gate 69. The transition of $Q_2$ causes storages 37 and 39 to interchange their roles as INPUT and OUTPUT storages.

The address words that are stored after the BEGIN instruction, specify the level $t$ signals to be related to generate the first $(t+1)$ signals. The control word 41 continues to be accessed with one NEXT instruction and a number of address words for each gate $P(t+1, i)$ simulation.

The process continues until the level R signals corresponding to the Boolean function signals B(O), B(1) ... B$(d-1)$ are generated. They will occupy the first $d$ consecutive locations of the output RAM. There may be none, one, or more than one of the B signals equal to "1". If there is exactly one B=1 the corresponding character of the recognition alphabet must be identified, otherwise, an indication that the circuitry did not recognize a character must be produced.

The following control word accessed from control word storage 41 is a SCAN instruction indicatng that the resultant Boolean function signals have been produced. The SCAN instruction is utilized to initiate a sequence of operations to inspect the B signals for determining whether none, one, or more than one B signal is "true", i.e. equals 1.

Figure 9:
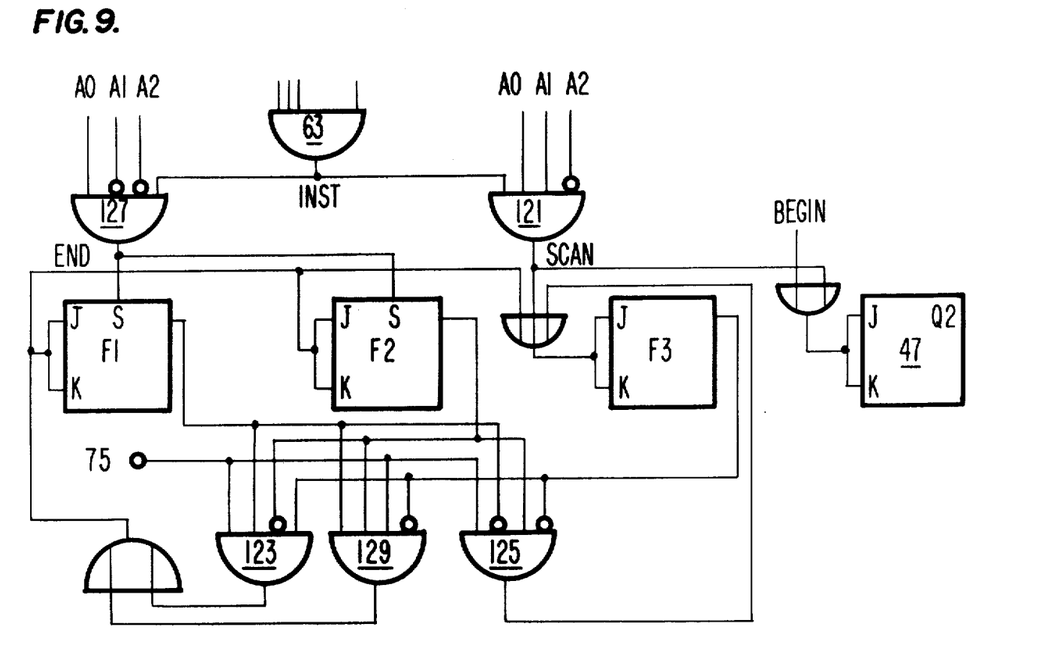

Referring to FIG. 9, AND gate 121 produces a SCAN signal where SCAN = $A(0) * A(1) * \overline{A(2)} *$ INST for producing a 1 output to indicate the SCAN instruction has been received. A SCAN = 1 resets the $Q_2$ storage register 47 for switching the RAM storage containing the resultant B signals to its input mode for operational access thereon by the system.

SCAN = 1 also toggles the F3 storage register from its prior 0 value to a 1 value, switching the system state of $F = (1, 0, 0)$ to $F = (1, 0, 1)$. The state $F = (1, 0, 1)$ is considered as the NO-B-TRUE state of the system, indicating that all of the generated resultants are 0. The system is initially set to this state by the SCAN instruction before scanning the B resultants, whereby an encounter of $B = 1$ during scanning will operate to switch the state of the system.

The SCAN instruction is followed in control word storage 41 by address words containing the addresses 0 through $(d-1)$. As was previously described with respect to FIG. 6, the value stored in the input RAM retrieved by an address word is produced at node 75. Node 75 is also shown in FIG. 9, from which the B resultants are fed to a pair of AND gate 123 and 125 as the resultants are addressed by the scanning address words following the SCAN instruction. During the Boolean function generation when the system state is $F=(1, 0, 0)$, the AND gates 123 and 125 are held at zero.

In the state $F=(1, 0, 1)$ gate 123 produces a 1 output upon receipt of a 1 input from node 75, indicating the access of a first B resultant equal to 1. The 1 output from AND gate 123 toggles storage registers F1, F2, and F3 switching the systems state of $F=(1, 0, 1)$ to $F=(0, 1, 0)$. The system state $F=(0, 1, 0)$ is considered as the ONE-B-TRUE state of the system to indicate that only one of the generated resultants equals 1.

In this state of $F=(0, 1, 0)$, gate 125 will produce a 1 output upon subsequent receipt of a 1 input at node 75 indicating the access of a second B resultant equal to 1. The 1 output from AND gate 125 toggles F3 storage register, bringing the system into a TWO-B-TRUE state of $F=(0, 1,1)$. The system remains in this state through the remainder of the address words following the SCAN instruction.

After the completion of accessing of the SCAN address words in storage 41, the system will be in a state indicative of whether or not only one character was recognized from the Boolean operation, i.e. a NO-B-TRUE state of $F=(1, 0, 1)$, a ONE-B-TRUE state of $F=(0, 1, 0)$, or a TWO-B-TRUE state of $F=(0, 1, 1)$. If there is exactly one B that is true, then $F3=0$, otherwise $F3=1$.

The system is now instructed to interpret the state F of the system for producing an output code of the alphabetical character $C_i$ corresponding to the resultant $B_i$ generated, or for producing an output code indicating that the character was not recognized.

An END instruction follows the last scanning address word to initiate the generation of the character output code corresponding to the character recognized by the system. The B resultants are scanned a second time for outputting the code of the character $C_i$ corresponding to the $B_i$ signal equal to 1.

The output address register of the opposite RAM is utilized to formulate the character $C_i$ code according to the location of $B_i$ in the input memory. The output address register is initialized to 0, 0 . . . 0 and incremented by 1 as each B signal is scanned. Thus, as $B_0$ is scanned, the output register contains the binary zero, 0, 0, 0 . . . 0, as $B_1$ is scanned the output register contains the binary one, 0, 0, 0 . . . 1, and so on until as $B_{d-1}$ is scanned the output register contains the value of $d-1$ in binary code.

Upon scanning the $B_i$ resultant which equals 1, the output address register is locked at its then code value and transmits the same as the code of the character $C_i$ which has been recognized.

Referring to FIG. 9, AND gate 127 produces a END signal where END = A(0) * $\overline{A(1)}$ * $\overline{A(2)}$ * INST for producing a 1 output to indicate that the END instruction has been received. A END = 1 toggles F1 and F2 bringing the system into a state $F=(1, 1, t)$ where $t$ is either 0 or 1 indicating whether or not only one B equals 1.

Figure 10:
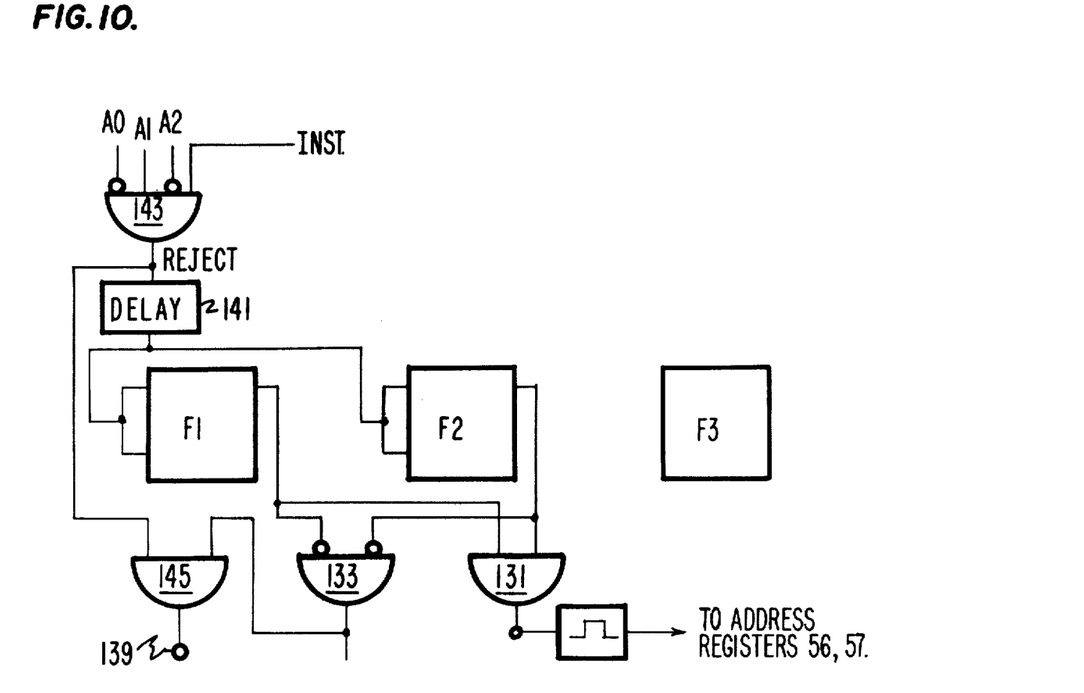

Referring to FIG. 10, the state $F=(1, 1, t)$ produces a 1 output at AND gate 131 which is fed to the clear inputs of the JK FFs of the output address register identified by the value of $Q_2$. The output address register now contains the code 0, 0 . . . 0 and is ready to begin incrementation.

Following the END instruction are address words containing the addresses 0 through $(d-1)$. Between each of these address words is a NEXT instruction utilized for incrementing the output address register as the next instructions are accessed from storage 41.

Thus, the first address word retrieves the $B_0$ signal stored in address 0, to node 75 (FIG. 9). Where $F=(1, 1, 0)$ indicating only one B is true, AND gate 129 produces a 1 output when the B signal at node 75 is 1. Thus, whenever gate 129 has a 1 output, only one resultant B signal exists and that signal is stored at the location of the input RAM just accessed.

The NEXT instruction between each of the address words is used to increment the output code in the output address register according to the same fashion as previously described with respect to FIG. 7 from the AND gate 93. Thus, upon receipt of a $B_i=1$ gate 129 produces a 1 output and the output register will have the binary value of $i$ stored in the output address register, i.e. if $B_8=1$, then the output address register would contain a binary eight, i.e., . . . 0, 1, 0, 0, 0.

An output of 1 from AND gate 129 toggles F1, F2 and F3 storages switching F to (0, 0, 1). This state of the system indicates that one B signal has resulted from the Boolean operation and that B signal is indicated by the code word stored in the address output register. Thus, with $F=(0, 0, 1)$ the output register is protected from any attempt of further changes.

Referring to FIG. 10, AND gate 133 produces a 1 output which is fed to AND gates 135 of FIG. 7 to prevent further incrementation of the output address register, and fed to gates 137 for transmitting the contents of the address output register as the output code of the character recognized at nodes 138.

With $F=(0, 0, 1)$ the system operates to search the control word storage 41 for the INITIALIZATION instruction. Referring to FIG. 4, upon receipt again of the INITIALIZATION instruction NOR gate 65 operates to switch the system state to $F=(0, 0, 0)$ discontinuing the instruction search and placing the system in its idle state with appropriate gates initialized to begin a new Boolean function generation upon activation at switch 68.

Where, however, none or more than one of the B resultants equal 1, F3=1, gate 129 of FIG. 9 will not operate to place the system in its $F=(0, 0, 1)$ instruction searching state before the last code scanning address is accessed from control word storage 41. The system will thus remain in its (1, 1, 1) state, running through the address words until the last instruction word REJECT is accessed.

Referring to FIG. 10, AND gate 143 produces a REJECT signal where REJECT = $\overline{A(0)}$ * A(1) * $\overline{A(2)}$ * INST for producing a 1 output to indicate that the REJECT instruction has been received. A REJECT = 1 from AND gate 143 is transmitted from output node 139 as the output code indicating that the character scanned was not recognized by the system. The REJECT signal after being delayed by delay element 141 toggles F1 and F2 to $F=(0, 0, 1)$ for searching of the INITIALIZATION instruction. The AND gate 145 prevents a REJECT output code from transmission when the system enters the instruction searching state of $F=(0, 0, 1)$ when one $B_i$ is true.

It should be understood of course that the foregoing disclosure relates to a preferred embodiment of the invention and that other modifications or alterations may be made therein without departing from the spirit or scope of the invention as set forth in the appended claims.

What is claimed is:

1. In a stored logic, Boolean function generator comprising an operator storage means for storing a predetermined sequence of Boolean operations, a first memory means and a second memory means for storing binary signals, an output storage means and circuitry means coupled to said operator storage means, said first memory means and said second memory means, and said output storage means, a method for performing a Boolean function by executing said predetermined sequence of Boolean operations stored in said operator storage means by successively configuring said circuitry means to execute said predetermined sequence of Boolean operations on said binary signals as they are transferred between said first memory means and said second memory means via said configured circuitry means, said method comprising the steps of:

(1) loading said predetermined sequence of Boolean operations into said operator storage means;

(2) loading said binary signals into said first memory means;

(3) transferring one of said sequence of Boolean operations from said operator storage means to said circuitry means;

(4) executing said transferred Boolean operation in said circuitry means upon said binary signals stored in said first memory means and storing the operational results in said second memory means;

(5) transferring another of said sequence of Boolean operations from said operator storage means to said circuitry means;

(6) executing said another transferred Boolean operation in said circuitry means upon said binary signals stored in said second memory means and restoring the results in said first memory means;

(7) continually performing steps (3) – (6) until all of said predetermined sequence of Boolean operations have been executed; and (8) transferring the results of said last performed Boolean operations to said output storage means.

2. The method of claim 1 wherein the Boolean operations loaded into said operator storage means comprise logical AND functions and logical OR functions.

3. An apparatus for executing a Boolean function by performing on an array of binary signals a sequence of Boolean operations which comprise said Boolean function, said apparatus comprising:

circuitry means for executing Boolean operations on binary signals supplied thereto;

first storage means coupled to said circuitry means for storing said array of binary signals and for bidirectionally transferring said binary signals to said circuitry means;

second storage means coupled to said circuitry means for storing said array of binary signals and for bidirectionally transferring said binary signals to said circuitry means; and control word storage means coupled to said circuitry means for storing said sequence of Boolean operations and for successively supplying said operations to said circuitry means for causing said circuitry means to execute said successively supplied Boolean operations on said array of binary signals, said control word storage means also coupled to said first storage means and said second storage means for controlling the transfer of said binary signals from said first storage means and said second storage means to and from said circuitry means such that when one of said storage means is transferring said binary signals to said circuitry means for the execution of one of said Boolean operations, the other of said storage means stores the results of the execution of said Boolean operation on said binary signals.

4. The apparatus of claim 3 wherein said Boolean operations executed by said circuitry means on said binary signals comprise logical AND operations and logical OR operations.

5. The apparatus of claim 4 wherein said circuitry means further includes an operation selector means controlled by said control word storage means for selecting the Boolean operation to be executed by said circuitry means, said operation selector means having two controlled states, said first state equalling a "high" value and corresponding to a logical AND operation and said second state equalling a "low" value and corresponding to a logical OR operation.

6. The apparatus of claim 3 wherein said circuitry means further includes means controlled by said sequence of Boolean operations stored in said control word storage means for inverting selected binary signals transferred to said circuitry means by said first storage means or said second storage means.

7. The apparatus of claim 3 further comprising a first address selecting means coupled to said first storage means and a second address selector means coupled to said second storage means for controllably addressing the binary signals within their respectively coupled storage means.

8. The apparatus of claim 3 further including output receiving means coupled to said circuitry means for storing the results of said Boolean function after all operations in said sequence of Boolean operations have been executed on said binary signals.

* * * * *